United States Patent
Kim et al.

(10) Patent No.: US 7,098,262 B2
(45) Date of Patent: Aug. 29, 2006

(54) POLYACETAL RESIN COMPOSITION HAVING EXCELLENT WEAR RESISTANCE AND ABRUPTION-PREVENTING EFFECT

(75) Inventors: Tak-Kyu Kim, Yongin (KR); Chung-Youl Jung, Anyang (KR); Ki-Chul Shin, Gunpo (KR)

(73) Assignee: Korean Engineering Plastics Co., Ltd., Seoul (KR)

( * ) Notice: Subject to any disclaimer, the term of this patent is extended or adjusted under 35 U.S.C. 154(b) by 9 days.

(21) Appl. No.: 10/505,421

(22) PCT Filed: Feb. 21, 2003

(86) PCT No.: PCT/KR03/00362

§ 371 (c)(1), (2), (4) Date: Aug. 24, 2004

(87) PCT Pub. No.: WO03/070827

PCT Pub. Date: Aug. 28, 2003

(65) Prior Publication Data

US 2005/0119384 A1    Jun. 2, 2005

(30) Foreign Application Priority Data

Feb. 25, 2002    (KR) .................. 10-2002-0009978

(51) Int. Cl.
*C08K 5/10* (2006.01)

(52) U.S. Cl. .................. 524/310; 524/563; 524/593

(58) Field of Classification Search .................. 524/310
See application file for complete search history.

(56) References Cited

U.S. PATENT DOCUMENTS

| 3,805,985 | A | * | 4/1974 | Hagiwara et al. .......... 215/12.2 |
| 4,214,034 | A |   | 7/1980 | Kodera et al. |
| 5,886,066 | A | * | 3/1999 | Forschirm .................... 523/200 |
| 6,284,828 | B1 |  | 9/2001 | Takayama |
| 6,753,363 | B1 | * | 6/2004 | Harashina .................... 524/99 |

FOREIGN PATENT DOCUMENTS

| EP | 0 432 888 A2 | 6/1991 |
| JP | 55-005934 | 1/1980 |
| JP | 2-166151 | 6/1990 |
| KR | 1994-0001168 | 2/1994 |
| KR | 10-1994-0014603 | 7/1994 |

* cited by examiner

*Primary Examiner*—Edward J. Cain
(74) *Attorney, Agent, or Firm*—McDermott Will & Emery LLP

(57) ABSTRACT

Disclosed is a polyacetal resin composition including a polyoxymethylene homopolymer or copolymer, an antioxidant, a thermal stabilizer, a polyethylene vinylacetate copolymer and hydroxyl pentacrythritol fatty acid ester. The polyacetal resin composition is excellent in mechanical properties, chemical resistance, heat resistance, dimensional stability, and electrical properties. Further, the composition is advantageous in terms of superior wear resistance and abruption-preventing effect.

5 Claims, 2 Drawing Sheets

Test specimen
outer diameter : 25.6 mm
inner diameter : 20 mm
hight : 15 mm

Load ( 6.6 kgf, 11.8 kgf )

Linear velocity
( 10 cm/s, 30 cm/s )

POLYACETAL RESIN COMPOSITION HAVING EXCELLENT WEAR RESISTANCE AND ABRUPTION-PREVENTING EFFECT

TECHNICAL FIELD

The present invention relates to polyacetal resin compositions having excellent wear resistance and abruption-preventing effect. More specifically, the present invention is directed to a polyacetal resin composition comprising a polyoxymethylene homopolymer or copolymer, an antioxidant, a thermal stabilizer, a polyethylene vinylacetate copolymer and hydroxyl pentaerythritol fatty acid ester, which exhibits superior wear resistance and abruption-preventing effect, and a molded article prepared therefrom.

PRIOR ART

Generally, a polyacetal resin which is excellent in mechanical and electrical properties, chemical resistance, heat resistance and dimensional stability, has been widely used in home appliances as well as automotive fields. In particular, the polyacetal resin is known to be superior in not only mechanical properties but also resistance to friction and wear, and has been used for application fields requiring friction-wear resistance, such as gears and bearings. However, with a great industrial advances, there is increasing need for various properties and resistance to friction and wear of the polyacetal resin.

In order to increase resistance to friction and wear of a polyacetal resin, there is proposed use of an oil or lubricating agent which is responsible for enhancing slidability and decreasing surface tension of the polyacetal resin. However, in cases where articles prepared from the polyacetal composition are subjected to high loads, noise occurs and the polyacetal resin is worn or abraded. Accordingly, the above component may be limited in its use.

With the aim of solving the problems caused by use of the oil or lubricating agent, a polymer type anti-wear additive may be used. This additive is exemplified by polyolefin resin such as a polyethylene copolymer, and a fluorine resin. But, the polymer type anti-wear additive is incompatible with the polyacetal resin, thus lowering general properties of the polyacetal resin composition upon its use. Further, upon injection molding, surface abruption of the molded articles attributable to phase separation between the polyacetal resin and the anti-wear additive occurs. Thus, the polymer type anti-wear additive is limited in its usable amount. Thereby, limitations are imposed on improvement of resistance to friction and wear of the polyacetal resin through employment of the polymer type anti-wear additive.

Research into balance of formability, resistance to surface abruption and mechanical properties while increasing friction and wear resistance of a polyacetal resin by using the polymer type anti-wear additive has been ongoing. In Korean Patent Publication No. 94-1168, there is disclosed a method increasing compatibility of a polyacetal resin and a polymer type anti-wear additive with the use of a specific inorganic compound. However, the above method attempts to solve the abruption problems through physical mixing by use of the inorganic compound, rather than to increase compatibility between the above two materials.

DISCLOSURE OF THE INVENTION

Leading to the present invention, the intensive and thorough research into polyacetal compositions, carried out by the present inventors aiming to solve the problems encountered in the prior arts, resulted in the finding that, upon preparation of a polyacetal resin composition, a polyethylene vinylacetate copolymer is used as a polymer type anti-wear additive to improve friction-wear resistance of the polyacetal resin, and hydroxyl pentaerythritol fatty acid ester is used to solve the problems related to surface abruption of articles prepared from the polyacetal resin.

Therefore, it is an object of the present invention to provide a polyacetal resin composition showing an excellent abruption-preventing effect upon molding as well as an improved wear resistance.

It is another object of the present invention to provide a molded article prepared from the polyacetal composition.

According to an embodiment of the present invention, there is provided a polyacetal composition having excellent wear resistance and abruption-preventing effect, comprising 100 parts by weight of a polyoxymethylene homopolymer having a monomeric unit represented by the following Formula 1 or a random copolymer having a monomeric unit of the Formula 1 and a monomeric unit represented by the following Formula 2; 0.01–1.0 parts by weight of an antioxidant; 0.01–1.0 parts by weight of a thermal stabilizer; 0.5–5.0 parts by weight of a polyethylene vinylacetate copolymer represented by the following Formula 3; and 0.1–2.0 parts by weight of hydroxyl pentaerythritol fatty acid ester represented by the following Formula 4:

Formula 1

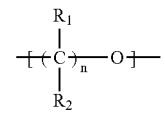

Formula 2

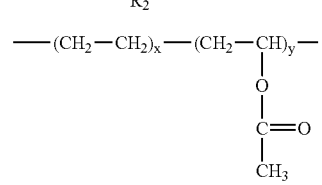

Formula 3

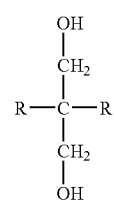

Formula 4

Where $R_1$ and $R_2$, which are the same or different, each represents hydrogen, an alkyl group and an aryl group; n represents an integer of 2–6; x represents a content of polyethylene in the range of 97–59 parts by weight and y represents a content of vinylacetate in the range of 3–41 parts by weight; and R is $-CH_2-O-CO-C_AH_B$ in which A is an integer of 8–19 and B is an integer of 17–39.

According to another embodiment of the present invention, there is provided a molded article prepared from the polyacetal composition, comprising various gears of electric, electronic and automotive fields, vertical blinder parts or conveyer belts.

BEST MODES FOR CARRYING OUT THE INVENTION

Figure 1:
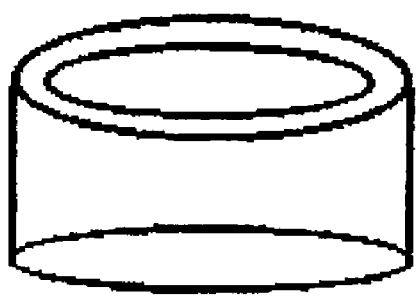
FIG. 1 is a view schematically showing a process measuring wear resistance of a polyacetal resin composition according to the present invention.
Figure 1:
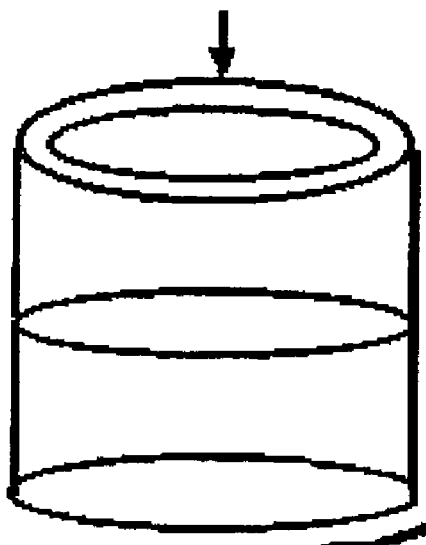

In accordance with the present invention, the polyacetal resin (A) used as a base resin may be a polyoxymethylene homopolymer having a repeat unit represented by the following Formula 1 or a random copolymer having a monomeric unit of the Formula 1 and a monomeric unit represented by the following Formula 2:

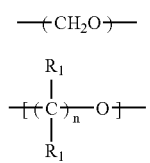

Formula 1

Formula 2

Where $R_1$ and $R_2$, which are the same or different, each represents hydrogen, an alkyl group and an aryl group, and n is an integer of 2–6.

A catalyst used for polymerization of the polyoxymethyleme copolymer is exemplified by known anionic or cationic catalysts. Examples of such a catalyst for use in polymerization of trioxane (trimer of formaldehyde) include halogens, such as chlorine, bromine or iodine; organic or inorganic acids, such as alkyl or aryl sulfonic acid, $HClO_4$, $HIO_4$, $HClO_4$ derivatives, $CPh_3C(IO_4)$ or $R_3SiHSO_4$; metal halides, such as $BF_3$, $SbF_3$, $SnCl_4$, $TiCl_4$, $FeCl_3$, $ZrCl_4$, $MoCl_5$ or $SiF_4$; complexes of metal halides, such as $BF_3.OH_2$, $BF_3.OEt_2$, $BF_3.CH_3COOH$, $BF_3.PF_5.HF$, $BF_3$-10-hydroxyacetophenol, $Ph_3CSnCl_5$, $Ph_3CBF_4$ or $Ph_3CSbCl_6$; metal ester, such as carboxylate of copper, zinc, cadmium, iron, cobalt or nickel; $P_2O_5+SO_2$ or $P_2O_5$ +phosphate ester; and combinations of organic metals and metal halides. In particular, it is preferred that coordinated compounds of boron trifluoride are used.

An antioxidant (B) usable in the present invention includes hindered phenols, for example, 2,2'-methylenebis (4-methyl-6-t-butylphenol), hexamethyleneglycol-bis-(3,5-di-t-butyl-4-hydroxyhydrocinnamate), tetrakis [methylene (3,5-di-t-butyl4-hydroxyhydrocinnamate)]methane, triethyleneglycol-bis-3-(3-t-butyl-4-hydroxy-5-methylphenyl) propionate, 1,3,5-trimethyl-2,4,6-tris(3,5-di-t-butyl-4-hydroxybenzyl)benzene, n-octadecyl-3-(4'-hydroxy-3', 5'-di-t-butylphenol)propionate, 4,4'-methylenebis(2,6-di-t-butylphenol), 4,4'-butylidene-bis-(6-t-butyl-3-methyl-phenol), di-stearyl 3,5-di-t-butyl-4-hydroxybenzylphosphate, 2-t-butyl-6-(3-t-butyl-5-methyl-2-hydroxybenzyl)-4-methylphenylcrylate, 3,9-bis2-[3-(3-t-butyl-4-hydroxy-5-methylphenyl)propionyloxy]-1,1 -dimethylethyl-2,4,8,10-tetraoxaspiro[5,5]undecane, etc.; and hindered amines, for example, 4-acetoxy-2,2,6,6-tetramethylpiperidine, 4-stearoyloxy-2,2,6,6-tetramethylpiperidine, 4-acryloxy-2, 2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl)oxalate, bis(2,2,6,6-tetramethyl-4-piperidyl)alonate, bis(2,2,6,6-tetramethyl-4-piperidyl)adipate, bis(2,2,6,6-tetramethyl-4-piperidyl)sepacate, bis(1,2,2,6,6-pentamethyl-piperidyl)sepacate, bis(2,2,6,6-tetramethyl-4-piperidyl)terephthalate, 1,2-bis(2,2,6,6-tetramethyl-4-piperidyloxy)ethane, bis(2,2,6,6-tetramethyl-4-piperidyl)hexamethylene-1,6-dicarbamate, bis(1-methyl-2,2,6,6-tetramethyl-4-piperidyl)adipate, tris(2, 2,6,6-tetramethyl-4-piperidyl)benzene-1,3,5-tricarboxylate, etc. Among the above mentioned antioxidants, triethyleneglycol-bis-3-(3-t-butyl-4-hydroxy-5-methylphenyl)-propionate, 1,6-hexane-diol-bis-3(3,5-di-t-butyl-4-hydroxy-phenyl)propionate, or tetrakis[methylene(3,5-di-t-butyl-4-hydroxyhydrocinnamate)] methane is preferably used. More preferably, triethyleneglycol-bis-3-(3-t-butyl-4-hydroxy-5-methylphenyl)-propionate is used. Such an antioxidant is used in the amount of 0.01–1.0 parts by weight, and preferably of 0.1–0.5 parts by weight, on the basis of 100 parts by weight of the polyacetal resin (A).

In addition, a thermal stabilizer (C) used in the present invention is exemplified by nitrogen-containing compounds which serve to increase thermal stability of polyoxymethylene by reaction with formaldehyde, and is selected from the group consisting of 6-phenyl-1,3,5-triazine-2,4-triamine (benzoguanamine), 2,4,6-triamino-1,3,5-triazine (melamine), carbonyldiamide (urea), dicyandiamide, isophthalic dihydrazide (hydrazine) and alcohols including polyethyleneglycol, ethylene-vinylalcohol copolymer, sorbitol, sorbitan, etc. In particular, 2,4,6-triamino-1,3,5-triazine (melamine) is preferably used. The thermal stabilizer of polyoxymethylene is used in the amount of 0.01–1.0 parts by weight, and preferably of 0.1–0.5 parts by weight, on the basis of 100 parts by weight of the polyacetal resin (A).

Represented by the following Formula 3, a polyethylene vinylacetate copolymer (D) is suitable for use as a polymer type anti-wear additive in the present invention:

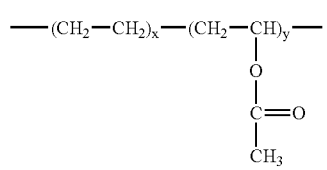

Formula 3

Where x represents a content of polyethylene in the range of 97–59 parts by weight and y represents a content of vinylacetate in the range of 3–41 parts by weight.

In such a polyethylene vinyl acetate copolymer, as content of polyethylene increases, friction-wear resistance of the polyacetal resin composition increases, but compatibility with the polyacetal resin is lowered, whereby surface abruption of articles molded from the polyacetal resin composition increases. Hence, it is preferred that the polyethylene vinylacetate copolymer contains at least 20 parts by weight of vinylacetate. In particular, vinylacetate is preferably used in the amount of about 28 parts by weight (about 72 parts by weight: polyethylene). The polyethylene vinylacetate copolymer has specific gravity of 0.93–0.98, and preferably of 0.95, and is used in the amount of 0.5–5.0 parts by weight, and preferably of 2.0–3.0 parts by weight, on the basis of 100 parts by weight of the polyacetal resin (A). If the above component is used in the amount less than 0.5 parts by weight, friction-wear resistance of the polyacetal composition is decreased. On the other hand, when the amount exceeds 5.0 parts by weight, the polyacetal resin composition is lowered in mechanical properties.

As a hydroxide fatty acid derivative (E) used in the present invention, hydroxyl pentaerythritol fatty acid ester is represented by the following Formula 4:

Formula 4

Where R is —$CH_2$—O—CO—$C_AH_B$ in which A is an integer of 8–19 and B is an integer of 17–39.

Figure 2:
FIG. 2 is a photograph showing layer separation of a molded article prepared from the conventional resin compositions.
Figure 3:
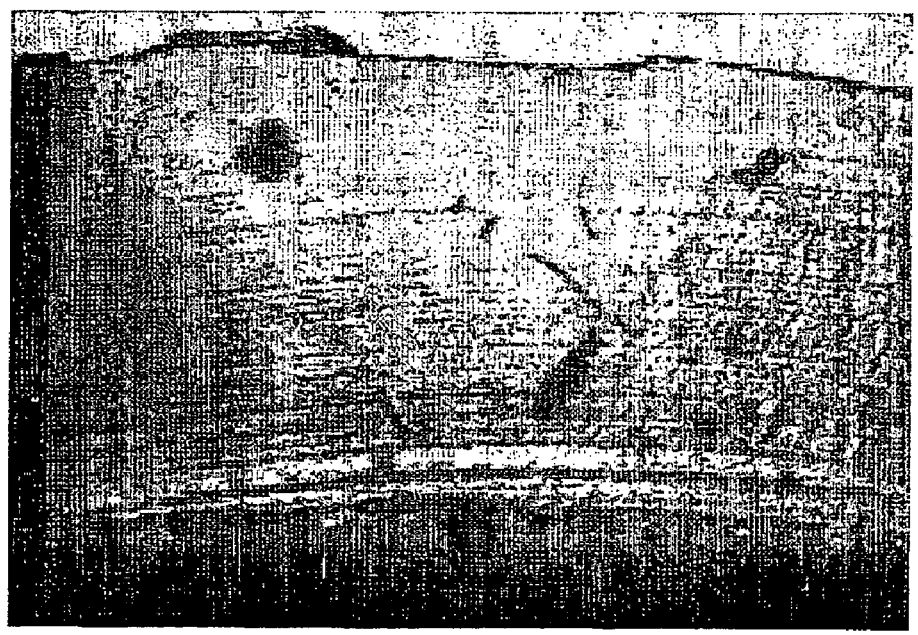
FIG. 3 is a photograph showing no layer separation and excellent abruption-preventing effect of a molded article prepared from the resin composition of the present invention.

Typically, a lubricating agent for use in increasing resistance to friction and wear of a polyacetal resin is exemplified by higher fatty acids having 20 or more carbons and derivatives thereof, mineral oils or hydrated wax. As represented in the above Formula 4, hydroxyl pentaerythritol fatty acid ester, which is a hydroxyl fatty acid derivative, includes a symmetrical structure of hydroxide groups, thereby increasing compatibility between polyethylene vinylacetate and the polyacetal resin, thus inhibiting surface abruption of the molded articles. This result is shown in FIG. 3. Conventionally used fatty acid or fatty acid ester does not react with polyacetal resin and polyethylene vinylacetate, resulting in inducing layer separation between the polyacetal resin and the polyethylene vinylacetate. As can be seen in FIG. 2, pentaerythritol fatty acid ester has no reactivity with the polyacetal resin due to structural characteristics thereof, thus generating abruption of the polyacetal resin. Different reactivities of the conventional fatty acid or fatty acid ester and hydroxyl pentaerythritol fatty acid ester of the present invention were proved through the Examples and the Comparative Examples as mentioned below.

In particular, hydroxyl pentaerythritol fatty acid ester, in which A is 17 and B is 35, desirably functions to increase resistance to friction and wear of the polyacetal resin composition against metals. The hydroxyl pentaerythritol fatty acid ester is used in the amount of 0.1–2.0 parts by weight, and preferably of 0.4–1.0 parts by weight, on the basis of 100 parts by weight of the polyacetal resin (A). As such, when the amount of the above component is less than 0.1 parts by weight, the polyacetal resin composition is decreased in friction-wear resistance against metals. Meanwhile, the amount exceeding 2.0 parts by weight causes slip phenomenon during processing of the polyacetal resin composition, thus deteriorating processability.

Meanwhile, the stabilization of the present polyacetal resin composition may be performed by use of any conventional melt-blending devices employable for stabilization. Examples of such a device are a single-screw extruder equipped with single discharge port, a twin-screw extruder equipped with a multi-stage discharge port, and a twin-shaft paddle type continuous mixing extruder. An exemplified embodiment of the stabilization is as follows:

Each component of the present composition is mixed with common additives such as a polymerization stabilizing agent. Thereafter, the mixture is processed by the above device under addition of other common additives at the temperature (160–250° C.), which is higher than a melting point of polyoxymethylene, under reduced pressure of 150–400 torr, followed by being subjected to drying at 80° C. for 2–10 hours for post-treatment. In this regard, if the pressure and drying conditions fall outside of the above ranges, terminal moieties of polyacetal resin become increasingly unstable, thus decreasing thermal stability thereof.

By using the conventional process, thusly obtained resin composition may be molded into an article requiring resistance to friction and wear, for example, various gears in electric, electronic and automotive fields, vertical blinder parts, conveyor belts, etc.

Having generally described this invention, a further understanding can be obtained by reference to certain specific examples which are provided herein for purposes of illustration only and are not intended to be limiting unless otherwise specified.

Hereinafter, friction and wear resistance, abruption and layer separation of a polyacetal resin composition are measured as follows:

(1) Friction-Wear Resistance

As can be seen in FIG. 1, a test specimen having an outer diameter of 25.6 mm, an inner diameter of 20 mm and a height of 15 mm was obtained through an injection molding process. The resultant specimen was tested, against resins, at a linear velocity of 10 cm/s under a load of 6.6 kgf, and also, against metals, at a linear velocity of 30 cm/s under a load of 11.8 kgf. By use of the following equations, coefficient of kinetic friction and quantity of non-wear are calculated, to evaluate resistance to friction and wear (testing time: 2hr).

$$\text{Coefficient of Kinetic Friction} = \frac{\text{friction(kgf)} \times 10 \text{ cm}}{\text{load(kgf)} \times 1.14 \text{ cm}}$$

Quantity of Non-Wear =

$$\text{wear(mg)} / (\text{density(mg/mm}^3 \times \text{load(kgf)} \times \text{distance(km)}))$$

*Tester: Thrust type friction-wear tester (2) Abruption

A polyacetal resin composition was injection-molded at an injection velocity of 90% under pressure of 75 kgf/cm² using a general injector to give a disc type specimen (thickness 1 mm, diameter 100 mm), after which surface around the gate of the specimen was chipped by a knife and the extent of surface abruption was confirmed.

Surface Abruption:

0 (None) ←—Abruption Generation —→5 (Severe)

(3) Layer separation

A polyacetal resin composition was injection-molded at an injection velocity of 90% under pressure of 75 kgf/cm² using a general injector to give a disc type specimen (thickness 1 mm, diameter 100 mm), after which a vertical slice from the gate of the specimen was prepared and observed for layer separation by an optical microscope.

Layer separation: X (No), O (Yes)

EXAMPLE 1

100 parts by weight of a polyoxymethylene polymer was added with 3.0 parts, by weight of ethylene vinylacetate ($x=72$, $y=28$), 0.1 parts by weight of melamine, 0.3 parts by weight of triethyleneglycol-bis-3-(3-t-butyl-4-hydroxy-5-methylphenyl)-propionate and 0.4 parts by weight of hydroxyl pentaerythritol fatty acid ester. Then, the reaction mixture was introduced into a twin-screw extruder and extruded at 230° C. to give a resin composition, which was then dried at 80° C. for 5 hours, followed by injection molding the dried resin composition at 200° C. with the use of an injector, to yield a disc type specimen (thickness 1 mm, diameter 100 mm). Thusly obtained specimen was observed for abruption and layer separation. Separately, another specimen was tested to evaluate resistance to friction and wear.

EXAMPLE 2

The present example was performed in the same manner as in Example 1, except that 0.6 parts by weight of hydroxyl pentaerythritol fatty acid ester was used.

EXAMPLE 3

The present example was performed in the same manner as in Example 1, except that 0.8 parts by weight of hydroxyl pentaerythritol fatty acid ester was used.

EXAMPLE 4

The present example was performed in the same manner as in Example 1, except that 1.0 parts by weight of hydroxyl pentaerythritol fatty acid ester was used.

EXAMPLE 5

The present example was performed in the same manner as in Example 1, except that 2.0 parts by weight of hydroxyl pentaerythritol fatty acid ester was used.

EXAMPLE 6

The present example was performed in the same manner as in Example 1, except that 2.0 parts by weight of ethylene vinylacetate ($x=72$, $y=28$) and 2.0 parts by weight of hydroxyl pentaerythritol fatty acid ester were used.

EXAMPLE 7

The present example was performed in the same manner as in Example 1, except that 5.0 parts by weight of ethylene vinylacetate ($x=72$, $y=28$) and 2.0 parts by weight of hydroxyl pentaerythritol fatty acid ester were used.

COMPARATIVE EXAMPLE 1

A resin composition was prepared in the same manner as in Example 1, except that the composition containing 100 parts by weight of a polyoxymethylene polymer, 0.1 parts by weight of melamine and 0.3 parts by weight of triethyleneglycol-bis-3-(3-t-butyl-4-hydroxy-5-methylphenyl)propionate was used. The resin composition was measured for physical properties.

COMPARATIVE EXAMPLE 2

A resin composition was prepared in the same manner as in Example 1, except that the composition containing 100 parts by weight of a polyoxymethylene polymer, 2.0 parts by weight of ethylene vinylacetate ($x=72$, $y=28$), 0.1 parts by weight of melamine and 0.3 parts by weight of triethyleneglycol-bis-3-(3-t-butyl-4-hydroxy-5-methylphenyl)propionate was used. The resin composition was measured for physical properties.

COMPARATIVE EXAMPLE 3

A resin composition was prepared in the same manner as in Example 1, except that the composition containing 100 parts by weight of a polyoxymethylene polymer, 3.0 parts by weight of ethylene vinylacetate ($x=72$, $y=28$), 0.1 parts by weight of melamine and 0.3 parts by weight of triethyleneglycol-bis-3-(3-t-butyl-4-hydroxy-5-methylphenyl)propionate was used. The resin composition was measured for physical properties.

COMPARATIVE EXAMPLE 4

A resin composition was prepared in the same manner as in Example 1, except that the composition containing 100 parts by weight of a polyoxymethylene polymer, 3.0 parts by weight of ethylene vinylacetate ($x=72$, $y=28$), 0.1 parts by weight of melamine, 0.3 parts by weight of triethyleneglycol-bis-3-(3-t-butyl-4-hydroxy-5-methylphenyl)propionate, and 0.4 parts by weight of pentaerythritol fatty acid ester was used. The resin composition was measured for physical properties.

COMPARATIVE EXAMPLE 5

A resin composition was prepared in the same manner as in Example 1, except that the composition containing 100 parts by weight of a polyoxymethylene polymer, 3.0 parts by weight of ethylene vinylacetate ($x=72$, $y=28$), 0.1 parts by weight of melamine, 0.3 parts by weight of triethyleneglycol-bis-3-(3-t-butyl-4-hydroxy-5-methylphenyl)propionate, and 0.6 parts by weight of pentaerythritol fatty acid ester was used. The resin composition was measured for physical properties.

COMPARATIVE EXAMPLE 6

A resin composition was prepared in the same manner as in Example 1, except that the composition containing 100 parts by weight of a polyoxymethylene polymer, 3.0 parts by weight of ethylene vinylacetate ($x=72$, $y=28$), 0.1 parts by weight of melamine, 0.3 parts by weight of triethyleneglycol-bis-3-(3-t-butyl-4-hydroxy-5-methylphenyl)propionate, and 0.8 parts by weight of pentaerythritol fatty acid ester was used. The resin composition was measured for physical properties.

COMPARATIVE EXAMPLE 7

A resin composition was prepared in the same manner as in Example 1, except that the composition containing 100 parts by weight of a polyoxymethylene polymer, 3.0 parts by weight of ethylene vinylacetate ($x=72$, $y=28$), 0.1 parts by weight of melamine, 0.3 parts by weight of triethyleneglycol-bis-3-(3-t-butyl-4-hydroxy-5-methylphenyl)propionate, and 1.0 parts by weight of pentaerythritol fatty acid ester was used. The resin composition was measured for physical properties.

COMPARATIVE EXAMPLE 8

A resin composition was prepared in the same manner as in Example 1, except that the composition containing 100 parts by weight of a polyoxymethylene polymer, 3.0 parts by weight of ethylene vinylacetate (x=72, y=28), 0.1 parts by weight of melamine, 0.3 parts by weight of triethyleneglycol-bis-3-(3-t-butyl-4-hydroxy-5-methylphenyl)propionate, and 2.0 parts by weight of pentaerythritol fatty acid ester was used. The resin composition was measured for physical properties.

COMPARATIVE EXAMPLE 9

A resin composition was prepared in. the same manner as in Example 1, except that the composition containing 100 parts by weight of a polyoxymethylene polymer, 3.0 parts by weight of ethylene vinylacetate (x=72, y=28), 0.1 parts by weight of melamine, 0.3 parts by weight of triethyleneglycol-bis-3-(3-t-butyl-4-hydroxy-5-methylphenyl)propionate, and 0.6 parts by weight of glycerin monostearate. The resin composition was measured for physical properties.

The results of physical properties of the resin compositions obtained from Examples and Comparative Examples are shown in Table 1, below.

TABLE 1

| | Friction-Wear Resistance | | | | | |
| | Against Resin | | Against Metal | | | |
| No. | Coefficient of Kinetic Friction | Quantity of Non-Wear | Coefficient of Kinetic Friction | Quantity of Non-Wear | Abruption | Layer Separation |
|---|---|---|---|---|---|---|
| Ex. | | | | | | |
| 1 | 0.19 | 0.25 | 0.25 | 0.04 | 0 | X |
| 2 | 0.18 | 0.24 | 0.22 | 0.03 | 0 | X |
| 3 | 0.18 | 0.23 | 0.20 | 0.03 | 0 | X |
| 4 | 0.18 | 0.23 | 0.19 | 0.02 | 0 | X |
| 5 | 0.18 | 0.20 | 0.22 | 0.02 | 0 | X |
| 6 | 0.24 | 0.20 | 0.16 | 0.02 | 0 | X |
| 7 | 0.16 | 0.19 | 0.16 | 0.02 | 0 | X |
| C. Ex. | | | | | | |
| 1 | 0.36 | 5.70 | 0.52 | 0.08 | 0 | ○ |
| 2 | 0.24 | 5.86 | 0.51 | 0.05 | 1 | ○ |
| 3 | 0.24 | 0.42 | 0.47 | 0.04 | 1 | ○ |
| 4 | 0.23 | 0.32 | 0.45 | 0.04 | 1 | ○ |
| 5 | 0.20 | 0.24 | 0.23 | 0.04 | 2 | ○ |
| 6 | 0.19 | 0.23 | 0.21 | 0.03 | 4 | ○ |
| 7 | 0.18 | 0.23 | 0.20 | 0.03 | 5 | ○ |
| 8 | 0.18 | 0.23 | 0.19 | 0.03 | 5 | ○ |
| 9 | 0.19 | 0.23 | 0.25 | 0.03 | 3 | ○ |

From the results of the above Table 1, it can be seen that the polyacetal resin composition of the present invention is improved in friction and wear resistance against resins and metals. However, in cases of adding a fatty acid having no reactivity with polyacetal resin and polyethylene. vinylacetate, polyacetal resin compositions are increased in friction-wear resistance but have no abruption-preventing effect.

INDUSTRIAL APPLICABILITY

As described above, the polyacetal resin composition of the present invention is advantageous in terms of excellent mechanical properties, chemical resistance, heat resistance, dimensional stability and electrical properties. As well, the inventive polyacetal resin composition is increased in wear resistance with abruption-preventing effect.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A polyacetal composition having excellent wear resistance and abruption-preventing effect, comprising:
    (A) 100 parts by weight of a polyoxymethylene homopolymer having a monomeric unit represented by the following Formula 1 or a polyoxymethylene random copolymer having a monomeric unit of the Formula 1 and a monomeric unit represented by the following Formula 2;
    (B) 0.01–1.0 parts by weight of an antioxidant;
    (C) 0.01–1.0 parts by weight of a thermal stabilizer;
    (D) 0.5–5.0 parts by weight of a polyethylene vinylacetate copolymer represented by the following Formula 3; and
    (E) 0.1–2.0 parts by weight of hydroxyl pentaerythritol fatty acid ester represented by the following Formula 4:

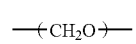

Formula 1

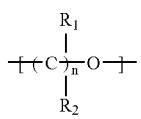

Formula 2

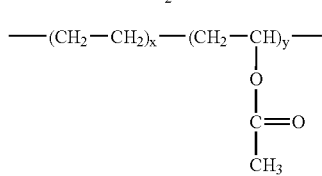

Formula 3

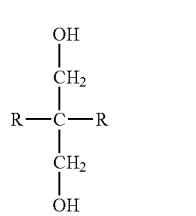

Formula 4 wherein $R_1$ and $R_2$, which are the same or different, each represent hydrogen, an alkyl group or an aryl group; n represents an integer of 2–6; x represents a content of polyethylene in the range of 97–59 parts by weight and y represents a content of vinylacetate in the range of 3–41 parts by weight; and R is —$CH_2$—O—CO—$C_AH_B$ in which A is an integer of 8–19 and B is an integer of 17–39.

2. The composition as defined in claim 1, wherein the polyethylene vinylacetate copolymer contains 20–41 parts by weight of vinylacetate.

3. The composition as defined in claim 1, wherein the polyethylene vinylacetate copolymer has specific gravity of 0.93–0.98.

4. A molded article of the polyacetal resin composition of any one of claims 1 to 3.

5. The molded article as defied in claim 4, wherein the molded article is various gears of electric, electronic and automotive fields, vertical blinder parts or conveyer belts.

* * * * *